United States Patent
Sirang et al.

(10) Patent No.: US 9,448,562 B1
(45) Date of Patent: Sep. 20, 2016

(54) UTILIZING ACCELERATION INFORMATION FOR PRECISION LANDING OF UNMANNED AERIAL VEHICLES

(71) Applicant: Skycatch, Inc., San Francisco, CA (US)

(72) Inventors: Behrooze Sirang, San Francisco, CA (US); Stephan Brown, San Francisco, CA (US)

(73) Assignee: SKYCATCH, INC., San Francisco, CA (US)

( * ) Notice: Subject to any disclaimer, the term of this patent is extended or adjusted under 35 U.S.C. 154(b) by 32 days.

(21) Appl. No.: 14/829,226

(22) Filed: Aug. 18, 2015

(51) Int. Cl.
  *G05D 1/00* (2006.01)
  *G05D 1/06* (2006.01)
  *B64C 39/02* (2006.01)

(52) U.S. Cl.
  CPC ........... *G05D 1/0676* (2013.01); *B64C 39/024* (2013.01); *B64C 2201/14* (2013.01); *B64C 2201/18* (2013.01)

(58) Field of Classification Search
  CPC ..................... B64C 2201/14; B64C 2201/201
  See application file for complete search history.

(56) References Cited

U.S. PATENT DOCUMENTS

| | | | | |
|---|---|---|---|---|
| 6,712,312 B1* | 3/2004 | Kucik | .................... | B64C 39/024 244/1 R |
| 7,871,044 B2* | 1/2011 | Hursig | .................... | B64C 27/20 244/183 |
| 8,630,755 B2* | 1/2014 | Ohtomo | ................ | B64C 39/024 348/144 |
| 8,979,023 B1* | 3/2015 | Wang | ..................... | B64C 25/32 244/100 A |
| 9,139,310 B1* | 9/2015 | Wang | ........................ | B64F 1/36 |
| 2007/0228214 A1* | 10/2007 | Horak | ................... | A63H 27/14 244/63 |
| 2015/0266575 A1* | 9/2015 | Borko | .................. | B64C 39/024 701/3 |

OTHER PUBLICATIONS

Möller, Paul. "Autonomous Landing of a Quadrotor Aircraft." Electronic Systems Laboratory, Dept. of Electric and Electronic Engineering, Stellenbosch University. Feb. 9, 2013.*
Smit, Samuel Jacobus Adriaan. "Autonomous Landing of a Fixed-Wing Unmanned Aerial Vehicle using Differential GPS." Thesis statement, Department of Electrical & Electronic Engineering, Stellenbosch University. Mar. 2013.*

* cited by examiner

*Primary Examiner* — Brian M O'Hara
*Assistant Examiner* — Michael Kreiner
(74) *Attorney, Agent, or Firm* — Keller Jolley Preece

(57) ABSTRACT

Systems and methods disclosed utilize acceleration information in landing an unmanned aerial vehicle. In particular, one or more embodiments include methods and systems that determine a UAV is landing, identify an acceleration spike relative to the UAV, and modify operation of the UAV while landing based on the acceleration spike. For example, in one or more embodiment, systems and methods identify an acceleration spike, compare the acceleration spike to a pattern indicative of contact with another object, and reduce the rate of rotation of rotors utilized by the UAV for flight based on the comparison of the acceleration spike to the pattern.

20 Claims, 8 Drawing Sheets

UTILIZING ACCELERATION INFORMATION FOR PRECISION LANDING OF UNMANNED AERIAL VEHICLES

BACKGROUND

1. Technical Field

One or more embodiments of the present disclosure relate generally to landing unmanned aerial vehicles. More specifically, one or more embodiments of the present disclosure relate to systems and methods that utilize acceleration information to land unmanned aerial vehicles.

2. Background and Relevant Art

In recent years, unmanned aerial vehicles ("UAVs") have become increasingly popular among businesses, individuals, and governments. UAVs provide a relatively inexpensive means to perform many tasks that require aerial navigation—tasks that may otherwise require chartering an airplane, helicopter, or other, more expensive, aeronautical vehicle. For example, businesses now commonly utilize UAVs for capturing digital aerial images, for surveillance, for transportation, for parcel and/or message delivery, and for a variety of other applications.

However, most UAV operators face a common problem: landing UAVs in a safe, efficient, and precise manner. Indeed, regardless of the particular application or objective of a UAV during flight, UAVs that take off generally must land. Accordingly, a number of UAV landing systems have been developed that either assist in manually landing a UAV (i.e., assist a remote pilot in landing a UAV) or autonomously land a UAV. Although these common systems generally assist in landing UAVs, a number of problems exist with regard to their operation.

For example, in many common landing systems, a UAV will "bounce" (e.g., gyrate up and down) as it nears a landing site. This can occur for a variety of reasons—for example, because systems encounter ground interference or become less reliable as they approach the landing site. Such "bouncing" creates a variety of problems and concerns. As an initial matter, UAV users want a UAV that will land smoothly; bouncing frequently disappoints users as a matter of aesthetic operation. Moreover, "bouncing" can lead to wasted time, damaged property, and/or failed landing attempts. Thus, for example, in circumstances where a UAV utilizes a landing station, the UAV may bounce out of the landing station. Similarly, where a UAV lands directly on the ground, the UAV may repeatedly bounce on the ground. Moreover, in some circumstances, a landing UAV may come into contact with an individual, causing damage to both person and property.

These and other problems exist with regard to landing UAVs.

BRIEF SUMMARY

Embodiments of the present disclosure provide benefits and/or solve one or more of the foregoing or other problems in the art with systems and methods that utilize acceleration information to assist in landing a UAV. In particular, one or more embodiments include systems and methods that detect a sudden change in acceleration and, in response, modify operation of the UAV during landing.

For instance, in one or more embodiments, the disclosed systems and methods determine that a UAV is landing and detect an acceleration spike with regard to the UAV. The disclosed systems and methods compare the acceleration spike to a pre-defined threshold (e.g., a threshold indicative of contact with another object, such as a landing station) and, based on the comparison, modify operation of the UAV (e.g., turn off rotors used by the UAV in flight).

By modifying operation of the UAV based on acceleration information, the disclosed systems and methods assist landing systems that may lose sensitivity or guidance information in close proximity to a landing site. For example, a UAV can obtain acceleration information and adjust its operations based on the acceleration information, where other information (e.g., barometer readings) may be less effectual.

Moreover, the disclosed systems and methods reduce "bouncing" or gyration of a UAV during landing operations. For example, by utilizing acceleration information (e.g., acceleration information indicative of contact with the ground or a landing station), the disclosed systems and methods can reduce power to the motors generating lift for the UAV, thus, avoiding unnecessary revving and bouncing common to many landing systems.

In addition, by utilizing acceleration information during landing, the disclosed systems and methods can assist in avoiding injury to individuals and/or damage to property. For instance, in one or more embodiments, the disclosed systems and methods can shut down a UAV upon acceleration information indicative of contact with an individual; thus reducing the risk of unnecessary injury.

Additional features and advantages of exemplary embodiments of the present disclosure will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

In order to describe the manner in which the above recited and other advantages and features can be obtained, a more particular description will be rendered by reference to specific embodiments that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting, various embodiments will be described and explained with additional specificity and detail through the use of the accompanying drawings in which.

DETAILED DESCRIPTION

Figure 1:
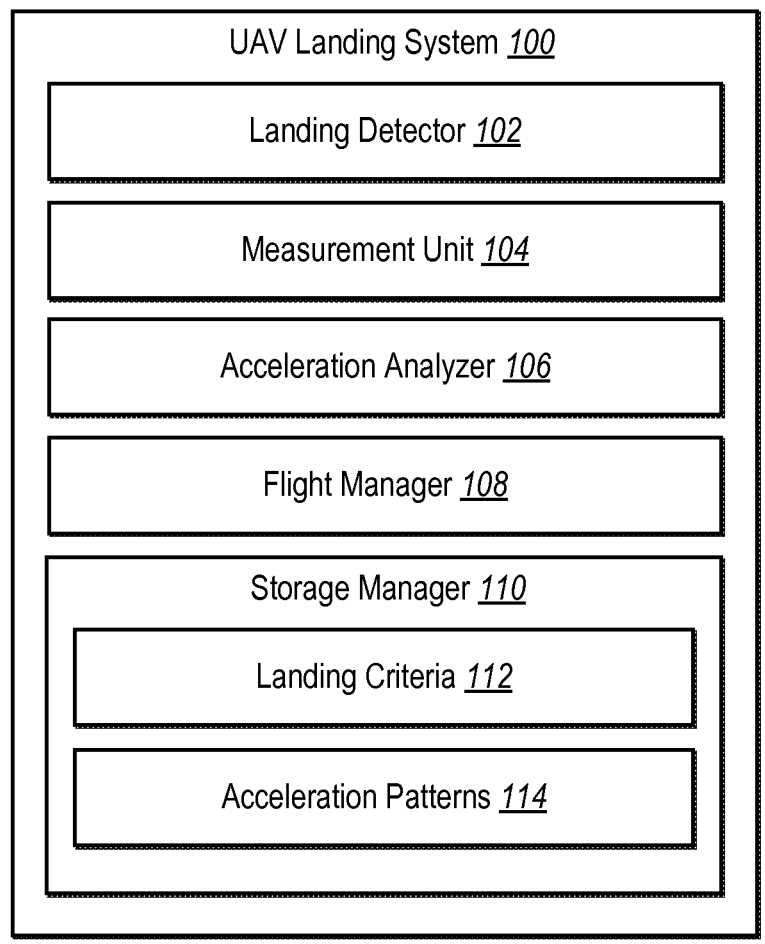
FIG. 1 illustrates a schematic diagram of a UAV landing system 100 in accordance with one or more embodiments.

One or more embodiments of the present disclosure include a UAV landing system. In particular, in one or more embodiments the UAV landing system utilizes acceleration information to assist in landing a UAV. For instance, the UAV landing system can detect a sudden change in acceleration and adjust operation of the UAV based on the sudden change in acceleration to more efficiently and safely land the UAV.

For example, in one or more embodiments, the UAV landing system determines that a UAV is landing and detects an acceleration spike with regard to the UAV. In one or more embodiments, the UAV landing system compares the acceleration spike to a pre-defined threshold and, based on the comparison modifies operation of the UAV while landing.

To reduce unnecessary bouncing or gyration of the UAV during landing, in one or more embodiments the UAV landing system can detect an acceleration spike indicative of contact with another object. For instance, the UAV landing system can compare the acceleration spike to a pre-defined pattern (e.g., magnitude and duration) that indicates contact with another object. In response to determining that the acceleration spike corresponds to contact with another object, the UAV landing system can reduce the rotational speed of one or more rotors utilized by the UAV for flight. In this manner, the UAV landing system can assist in a smooth landing upon detecting contact with another object.

By way of a more specific example, in one or more embodiments, the UAV landing system includes or is configured to control landing of a UAV within a landing station. The UAV may include sensors that operate in conjunction with transmitters affixed to the landing station to navigate the UAV toward the landing station. In one or more embodiments, however, when the UAV becomes too close to the landing station, the UAV's sensors may be unable to operate in conjunction with the transmitters. Even though the UAV landing system can no longer utilize one or more sensors or transmitters, the UAV landing system can descend towards the landing station and detect an acceleration spike indicative of contact with the landing station. Upon detecting an acceleration spike indicative of contact with the landing station, the UAV landing system can turn off motors powering the UAV in flight to complete the UAV landing. By turning off motors, in one or more embodiments, the UAV landing system reduces the risk of flying out of the landing station (e.g., contacting the landing station and flying out), bouncing, or coming into contact with other objects.

In addition to a dedicated landing station, in other embodiments, the UAV landing system may seek to land a UAV on the ground, or some other surface or landing site. The UAV landing system may navigate toward the landing site on the ground based on a variety of factors or sensors. To avoid bouncing or gyrating based on ground interference with one or more sensors, the UAV landing system may detect an acceleration spike indicative of contact with the ground and turn off rotors utilized by the UAV during flight.

Furthermore, the UAV landing system can determine and utilize additional information regarding an acceleration spike during landing. For instance, in one or more embodiments the UAV landing system can determine a direction associated with the acceleration spike and modify operation of the UAV based on the direction. Similarly, in one or more embodiments the UAV landing system can determine a location of the collision relative to the UAV (e.g., collision on the left side of the UAV) and selectively modify operation of the UAV based on the location.

In addition, in one or more embodiments, the UAV landing system can detect that a UAV is landing (and adjust its operation based on a determination that the UAV is landing). For example, during normal flight operations, the UAV may come into contact with tree branches, structures, or other objects. Although the UAV landing system can detect acceleration spikes due to contact with such objects, the UAV landing system can determine that the contact did not occur during landing and avoid altering operation of the UAV to facilitate landing (e.g. turning off motors) during normal flight operations.

The UAV landing system can utilize a variety of factors to detect that a UAV is landing. For example, in one or more embodiments, the UAV landing system can determine that the UAV is landing based on a throttle level, a rotation rate, and/or a velocity associated with the UAV. Similarly, the UAV landing system can determine that the UAV is landing based on the UAV being within a certain distance of a landing site, based on losing the ability to obtain information from one or more guidance transmitters associated with a landing station, based on crossing a boundary associated with a landing site, based on the UAV reaching a certain altitude, or some other factor.

As used herein, the phrase "acceleration spike" refers to a change in acceleration over a duration of time. In particular, an acceleration spike may refer to a change (e.g., change in direction, increase in magnitude, decrease in magnitude, or increase and decrease in magnitude) in acceleration with regard to a UAV during landing. For example, an acceleration spike may refer to a change in acceleration with regard to a UAV due to a collision with another object. More specifically, a UAV moving at an original velocity coming into a contact with another object will experience a change in velocity due to the collision and experience a corresponding acceleration spike (i.e., a change in acceleration over time due to the collision). An acceleration spike may be measured in various units by various devices. For example, acceleration can be measured in terms of coordinate acceleration (e.g., a change in velocity over time), it can be measured in terms of proper acceleration (e.g., a g-force experienced by an object), or some other unit or measurement.

As used herein, the term "landing" refers to the process (or any portion of the process) of bringing a UAV to a stationary resting position relative to a surface after flight. For example, landing may begin upon descending a UAV toward a landing site. Similarly, landing may conclude upon a UAV resting on the ground with all of its motors turned off.

Landing may include descending toward a landing site; navigating in relation to a landing site; coming into physical contact with the landing site; reducing the rate of one or more rotors, motors, or engines associated with the UAV; powering off one or more systems associated with the UAV; or any other process involved in bringing the UAV to a stationary resting position after a UAV flight.

Turning now to FIG. 1, additional detail will be provided regarding components and capabilities of one or more embodiments of the UAV landing system. In particular, FIG. 1 shows a schematic diagram illustrating an example embodiment of a UAV landing system ("landing system") 100. As shown in FIG. 1, in one or more embodiments, the landing system 100 comprises a landing detector 102, a measurement unit 104, an acceleration analyzer 106, a flight manager 108, and a storage manager 110. Moreover, the storage manager 110 may store and/or otherwise manage data representative of landing criteria 112 and acceleration patterns 114.

As illustrated in FIG. 1, the landing system 100 may include the landing detector 102. In one or more embodiments, the landing detector 102 determines if a UAV is landing (or in a particular portion of a landing process). For instance, in one or more embodiments the landing detector 102 identifies whether or not a UAV is landing so that the landing system 100 can enable one or more components or features. For instance, in one or more embodiments, the landing system 100 will not modify operation of a UAV based on acceleration information unless the UAV is landing. In other words, if the landing detector 102 determines that a UAV is not landing, the landing system 100 may disregard certain acceleration information.

The landing detector 102 can detect, identify, measure, compare, or analyze one or more factors to determine if a UAV is landing. For example, the landing detector 102 can determine that a UAV is landing based on factors, such as, distance from a landing site, altitude, velocity, throttle level, UAV rotation rate, interaction with one or more transmitters, crossing one or more boundaries, user input, or other factors. The landing detector 102 may determine that a UAV is landing by considering these factors in isolation or in combination, or by comparing these factors to one or more pre-defined thresholds.

Additional detail will be provided regarding these factors below. However, by way of specific example, in one or more embodiments the landing detector 102 can detect a throttle level (i.e., the amount of fuel or power provided to a motor or engine associated with a UAV) and compare the throttle level to a pre-defined throttle level threshold. More particularly, the landing detector 102 can compare a throttle level with a pre-defined throttle level threshold indicative of a landing event (e.g., a lower throttle level indicating descent) and determine whether the throttle level falls within the pre-defined throttle level threshold. Based on whether the throttle level falls within the pre-defined throttle level threshold, the landing detector 102 can determine whether the UAV is landing.

Similarly, the landing detector 102 can determine that a UAV is landing based on user input. For example, in one or more embodiments a user (e.g., a UAV pilot) can provide user input to the landing system 100 indicating that the UAV is initiating a landing sequence. For instance, a UAV pilot can provide user input via a computing device utilized to navigate the UAV indicating that the UAV is landing.

Additionally or alternatively, the landing detector 102 can determine that a UAV is landing based on a flight plan. For instance, in one or more embodiments, a UAV takes off, flies, and lands autonomously. In such circumstances, a UAV may receive a pre-defined flight plan to direct the UAV where to fly, how long to fly, at what elevation to fly, etc. As part of such a flight plan, a UAV may also receive landing instructions that direct the UAV when, where, and how to land. Accordingly, the UAV can detect that it is landing (or in a particular portion of landing) by reference to a flight plan (e.g., determine that the UAV is landing by detecting that the UAV is executing various portions of a landing sequence in a flight plan).

As FIG. 1 illustrates, the landing system 100 may also include the measurement unit 104. The measurement unit 104 measures, detects, calculates, and/or generates measurements or information. For example, the measurement unit 104 can detect information or measurements utilized by the landing detector 102, such as distances from a particular object or site, an altitude, a throttle level, or a UAV rotation rate. Similarly, the measurement unit 104 can interact with one or more transmitters, detect when a UAV crosses one or more boundaries, and detect other measurements. The measurement unit 104 may also measure acceleration, orientation, velocity, position, and/or any other measurable characteristic related to a UAV.

The measurement unit 104 can include any number of sensors or devices to perform its functions. In one or more embodiments, the measurement unit 104 comprises an inertial measurement unit. For instance, the measurement unit 104 may comprise an inertial measurement unit that includes one or more accelerometers, gyroscopes, and/or magnetometers. Similarly, the measurement unit 104 may include a barometer, altimeter, pitot tube, global positioning system (GPS), digital camera, LED sensor, SONAR sensor, RADAR sensor, electrical sensor, or other sensor or device. The measurement unit 104 may utilize these devices or sensors in isolation, or in combination, and any other sensors necessary to accomplish the features described herein.

Moreover, the measurement unit 104 can interact with one or more transmitters. For example, in one or more embodiments, the measurement unit 104 receives and/or processes data received from one or more transmitters associated with a landing station. For instance, a landing station may include one or more transmitters emitting one or more energy waves or signals. The measurement unit 104 can detect and convert such data for utilization by the landing system 100.

The measurement unit 104 can also generate measurements over time. For example, the measurement unit 104 can generate acceleration information with regard to a UAV over time. Similarly, the measurement unit 104 can generate velocity, position, or other information over time.

The measurement unit 104 can generate or detect linear, rotational, two-dimensional, three-dimensional or other kinds of measurements. For example, the measurement unit 104 can measure acceleration, velocity, or movement along a two-dimensional or three-dimensional plan. The measurement unit 104 can also measure pitch, roll, yaw, rotational/angular acceleration, rotational/angular velocity, or rotational/angular movement.

In one or more embodiments, the measurement unit 104 also detects one or more directions associated with various measurements. For example, the measurement unit 104 can detect one or more directions associated with acceleration. Thus, if a UAV collides with another object, the measurement unit 104 can determine a direction of acceleration associated with the collision. Alternatively or additionally, the measurement unit 104 may determine a magnitude of acceleration in a plurality of directions (e.g., a magnitude of acceleration in a vertical direction, a magnitude of acceleration in a north-south direction, a magnitude of acceleration in an east-west direction, or a magnitude of acceleration in a rotational direction).

The measurement unit 104 may also determine one or more locations with regard to contact with another object. In particular, in one or more embodiments, the measurement unit 104 determines a location with regard to a UAV that made contact with another object. For instance, the measurement unit 104 may determine that a UAV collided with an object on a particular side of the UAV.

As illustrated in FIG. 1, the landing system 100 may also include the acceleration analyzer 106. In one or more embodiments, the acceleration analyzer 106 compares, processes, analyzes, identifies, maintains, and/or modifies acceleration information or other information. In particular, the acceleration analyzer 106 can compare changes in acceleration, velocity, position, or other information over a duration of time (e.g., information generated or collected by the measurement unit 104).

For example, the acceleration analyzer 106 can identify an acceleration spike from acceleration data (e.g., data provided by the measurement unit 104). For example, in one or more embodiments the acceleration analyzer 106 analyzes acceleration data to determine local maxima or minima over time, and identifies acceleration spikes. Similarly, in one or more embodiments, the acceleration analyzer 106 can determine variation in acceleration and determine acceleration spikes based on the determined variation.

Moreover, in one or more embodiments the acceleration analyzer 106 compares an acceleration spike (or a change in velocity or position) to a pre-defined pattern. In particular, the acceleration analyzer 106 can access pre-defined acceleration patterns (e.g., acceleration patterns 114) and compare an acceleration spike to the pre-defined acceleration patterns. The pre-defined acceleration patterns may be indicative of a certain type of acceleration, for example, a collision with another object.

The acceleration patterns may comprise any number of features. For example, in one or more embodiments, the acceleration analyzer 106 compares a magnitude of an acceleration spike to a pre-defined acceleration threshold. Similarly, the acceleration analyzer 106 can compare an acceleration spike to a pre-defined duration threshold. The acceleration analyzer 106 may also compare other features of an acceleration pattern, including slope, volatility, direction, or other features.

In one or more embodiments, the acceleration analyzer 106 can also generate, create, calculate, or modify one or more patterns (e.g., patterns defining various thresholds). In particular, in at least one embodiment the acceleration analyzer 106 generates patterns based on previous flight information, acceleration information, user input, or other information. Moreover, the acceleration analyzer 106 can identify patterns particular to various flight events, accelerations, collisions, materials, or objects.

For instance, in one or more embodiments the landing detector 102 identifies when a UAV has landed. Based on that information, the acceleration analyzer 106 can identify acceleration spikes corresponding to the UAV coming into contact with another object (e.g., one or more large spikes in close time proximity to the UAV landing). Upon identifying an acceleration spike that corresponds to the UAV coming into contact with another object, the acceleration analyzer 106 can create (or modify) one or more patterns based on the identified acceleration spike.

Similarly, the acceleration analyzer 106 can create (or modify) one or more patterns based on acceleration spikes not indicative of a UAV coming into contact with another object. For example, in one or more embodiments the acceleration analyzer 106 compares features of acceleration spikes indicative of contact with another object (e.g., large acceleration spikes in close proximity to completing landing) with features of other acceleration spikes detected during flight or other landing operations. The comparison can allow the acceleration analyzer 106 to identify features (e.g., magnitude, duration, slope) unique to particular events. In this manner, the acceleration analyzer 106 can generate, create, or modify acceleration patterns (including thresholds) with regard to the particular events.

In alternative embodiments, the acceleration analyzer 106 can utilize user input to generate or modify one or more patterns or thresholds. For instance, a user can identify an acceleration spike that corresponds to a particular event and the acceleration analyzer 106 can generate a pattern based on the identified acceleration spike. Alternatively, the acceleration analyzer 106 can provide a pattern (e.g., one or more thresholds) via user input (e.g., via a computing device associated with the landing system 100).

Alternatively, the landing system 100 can also generate, create, receive, or calculate one or more thresholds or patterns based on previously collected flight information, user input, or from some other source.

In addition, as illustrated in FIG. 1, the landing system 100 may also include the flight manager 108. The flight manager 108 can control operation of the UAV in flight. In particular, in one or more embodiments the flight manager 108 controls a portion or all of the mechanical flight elements associated with a UAV. For example, in one or more embodiments, the flight manager 108 receives inputs from the measurement unit 104 and/or acceleration analyzer 106 and control various mechanical features of a UAV based on the received inputs. Specifically, the flight manager 108 can control mechanical features to land a UAV.

For example, the flight manager 108 can control the speed of one or more rotors associated with a UAV. For instance, the flight manager 108 can control the rotor speed by adjusting power (e.g., the throttle level) provided to an engine or motor powering rotors of a UAV. More particularly, in one embodiment, the landing system 100 utilizes a UAV with four horizontally mounted rotors. By controlling the speed of the horizontally mounted rotors, the flight manager 108 can cause a UAV to travel up and down vertically. Similarly, by turning off a motor or engine powering rotors of a UAV, the flight manager 108 can stop rotors from generating lift with regard to a UAV.

Additionally, in at least one embodiment, the flight manager 108 controls the pitch of one or more rotors associated with a UAV. Accordingly, by controlling the pitch of one or more rotors associated with a UAV, the flight manager 108 can cause a UAV to travel back and forth, and side to side horizontally. Thus it follows that, by controlling the speed and pitch of one or more rotors associated with a UAV, the flight manager 108 can cause a UAV to travel within an uninhibited three-dimensional space.

In one or more embodiments, the flight manager 108 receives data, measurements, or information (e.g., information from the measurement unit 104 or the acceleration analyzer 106) and processes, manipulates, modifies, and/or utilizes the data, measurements, or information to control operation of a UAV. For example, in one or more embodiments, the measurement unit 104 can receive information from one or more transmitters associated with a landing station relative to the location of a UAV. The flight manager 108 can analyze and utilize the information to modify the mechanical components of the UAV to navigate the UAV toward the landing station.

Similarly, the flight manager 108 can receive information from the acceleration analyzer 106 indicating that a UAV has collided with another object. Based on information indicating that a UAV has collided with another object, the flight manager 108 can control operation of a UAV. For example, the flight manager 108 can adjust one or more rotors associated with a UAV, turn off one or more engines or motors associated with a UAV, modify one or more rotor speeds, and/or modify the pitch of one or more rotors.

The flight manager 108 and the landing system 100 can operate in remotely piloted and/or autonomous flight implementations. For example, in one or more embodiments, the flight manager 108 can operate autonomously (e.g., automatically control navigation of the UAV while landing). In one or more embodiments, the flight manager 108 can receive user input regarding navigation during landing (e.g., input from a remote pilot via a computing device). For example, in one or more embodiments a remote pilot can navigate a UAV via a computing device to a landing site on the ground. The measurement unit 104 can detect an acceleration spike and the acceleration analyzer 106 can determine that the acceleration spike is indicative of contact between the UAV and the ground. In one or more embodiments, based on the determination that the UAV has contacted the ground, the flight manager 108 can automatically turn off rotors associated with the UAV (even where the remote pilot is otherwise providing input as to operation of the UAV).

As illustrated in FIG. 1, the landing system 100 may also include the storage manager 110. The storage manager 110 maintains data for the landing system 100. The storage manager 110 can maintain data of any type, size, or kind, as necessary to perform the functions of the landing system 100.

As illustrated, the storage manager 110 may include landing criteria 112. Landing criteria 112 may include thresholds for determining whether or not a UAV is landing. For example, landing criteria 112 may include a threshold for throttle level, rotation rate, velocity, altitude, or other thresholds. The landing criteria 112 may also include criteria related to a distance from a landing site, a boundary associated with landing, or other criteria indicating that a UAV is landing.

In addition, as illustrated in FIG. 1, the storage manager 110 may also include acceleration patterns 114. For instance, acceleration patterns 114 may include one or more acceleration patterns indicative of a collision with one or more objects. Acceleration patterns 114 may also include a magnitude threshold, a duration threshold, or other thresholds.

Each of the components 102-110 of the landing system 100 and their corresponding elements may be in communication with one another using any suitable communication technologies. It will be recognized that although components 102-110 and their corresponding elements are shown to be separate in FIG. 1, any of components 102-110 and their corresponding elements may be combined into fewer components, such as into a single facility or module, divided into more components, or configured into different components as may serve a particular embodiment. Moreover, one or more embodiments of the landing system 100 may include additional components or fewer components than those illustrated in FIG. 1.

The components 102-110 and their corresponding elements can comprise software, hardware, or both. For example, the components 102-110 and their corresponding elements can comprise one or more instructions stored on a computer-readable storage medium and executable by processors of one or more computing devices. When executed by the one or more processors, the computer-executable instructions of the landing system 100 can one or more devices to perform the methods described herein. Alternatively, the components 102-110 can comprise hardware, such as a special purpose processing device to perform a certain function or group of functions. Additionally or alternatively, the components 102-110 can comprise a combination of computer-executable instructions and hardware.

Furthermore, the components 102-110 of the landing system 100 and their corresponding elements may, for example, be implemented as one or more stand-alone applications, as one or more modules of an application, as one or more plug-ins, as one or more library functions or functions that may be called by other applications, and/or as a cloud-computing model. Thus, the components 102-110 of the landing system 100 and their corresponding elements may be implemented as a stand-alone application, such as a desktop or mobile application. Furthermore, the components 102-110 of the landing system 100 and their corresponding elements may be implemented as one or more web-based applications hosted on a remote server. Alternatively or additionally, the components of the landing system 100 may be implemented in a suit of mobile device applications or "apps."

Figure 2:
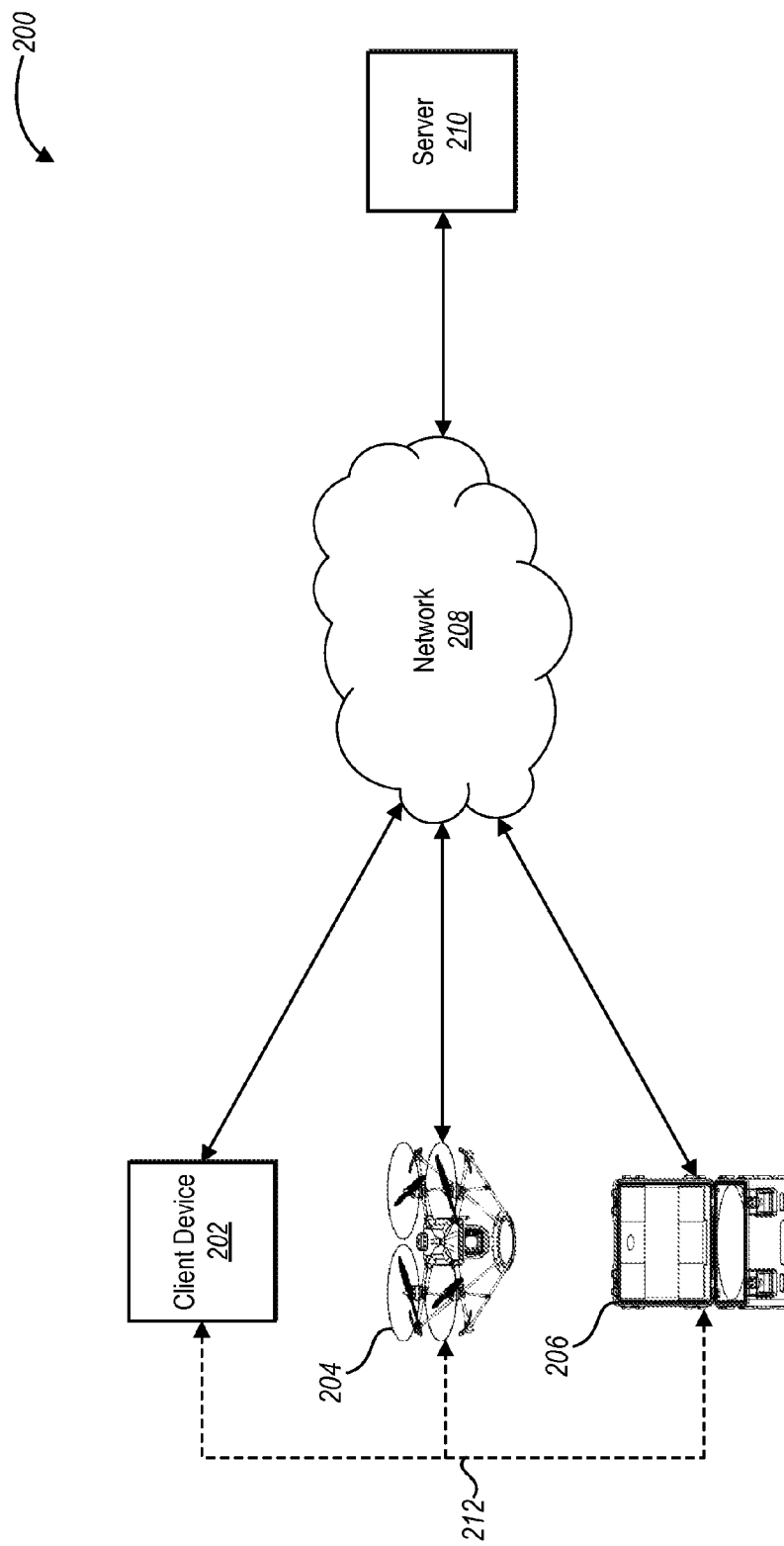
FIG. 2 illustrates a schematic diagram of an exemplary environment for implementing the UAV landing system in accordance with one or more embodiments.

Turning now to FIG. 2, further information will be provided regarding implementation of the landing system 100. Specifically, FIG. 2 illustrates a schematic diagram of one embodiment of an exemplary system environment ("system") 200 in which the landing system 100 can operate. As illustrated in FIG. 2, the system 200 can include a client device 202, a UAV 204, a landing station 206, a network 208, and a server 210. The client device 202, the UAV 204, the landing station 206, the network 208, and the server 210 may be communicatively coupled, as shown in FIG. 2.

The system 200, as illustrated in FIG. 2, may include the client device 202. The client device 202 may comprise any type of computing device. In particular, in one or more embodiments the client device 202 may comprise a computing device capable of controlling or otherwise communicating with the UAV 204, the landing station 206, and/or the server 210. More specifically, in one or more embodiments, a pilot may utilize the client device 202 to pilot the UAV 204. For example, the client device 202 may comprise one or more personal computers, laptop computers, mobile devices, mobile phones, tablets, special purpose computers, TVs, remote controls, or other computing devices. Similarly, the client device 202 may comprise one or more computing devices as discussed in greater detail below with regard to FIG. 7.

As used herein, the term "UAV" or "unmanned aerial vehicle" refers to an aircraft that can be piloted autonomously or remotely by a control system. Accordingly, the UAV 204 may comprise any type of UAV, including micro a UAV, low altitude UAV, or high altitude UAV, whether autonomously or remotely piloted. Similarly, the UAV 204 may include multi-rotor UAVs, single-rotor UAVs, blimp UAVs, or other types of UAVs. In particular, the UAV 204 may include an onboard computer that controls the autonomous flight of the UAV 204. In at least one embodiment, the UAV 204 is a multi-rotor vehicle, such as a quadcopter, and includes a carbon fiber shell, integrated electronics, a battery bay, a global positioning system ("GPS") receiver, a fixed or swappable imaging system (e.g., a digital camera), and various additional sensors and/or receivers. The UAV 204 may contain one or more computer-readable storage media and/or one or more processors with instructions stored thereon that, when executed by the one or more processors cause the UAV 204 to perform functions described herein.

Alternatively or additionally, the system 200 may include the landing station 206. The landing station 206 may be utilized to land, store, charge, guide, or repair the UAV 204. Moreover, the landing station 206 may be utilized to communicate with the UAV 204 prior to, during, or after a flight. In one or more embodiments, the landing station 206 can include a docking site to enable the UAV 204 to dock with the landing station 206. Similarly, the landing station 206 can include one or more transmitters that emit energy (e.g., light or other energy waves) to assist the UAV 204 in landing.

As illustrated in FIG. 2, the client device 202, the UAV 204, the landing station 206, and/or the server 210 may communicate via the network 208. The network 208 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 208 may be any suitable network over which the client device 202 (or other components) may access the server 210 or vice versa. The network 208 will be discussed in more detail below with regard to FIG. 7.

The server 210 may generate, store, receive, and transmit any type of data, including landing criteria 112, acceleration patterns 114, navigation information, or electronic communication data. For example, the server 210 may receive data from the client device 202, and send the data to the UAV 204 or the landing station 206. In one example embodiment, the server 210 is a data server. The server 210 can also comprise a communication server or a web-hosting server. Additional details regarding the server 210 will be discussed below with respect to FIG. 7.

Although FIG. 2 illustrates the single client device 202, the single UAV 204, and the single landing station 206, it will be appreciated that the client device 202, the UAV 204, and the landing station 206 can represent any number of computing devices, UAVs, or landing stations (fewer or greater than shown). Similarly, although FIG. 2 illustrates a particular arrangement of the client device 202, the UAV 204, the landing station 206, the network 208, and the server 210, various additional arrangements are possible.

For example, the client device 202, the UAV 204 and/or the landing station 206 may communicate directly one with another via the local connection 212. The local connection 212 may comprise any recognized form of wired or wireless communication. For example, in one or more embodiments the client device 202 may include a mobile computing device (e.g., tablet) utilized by a UAV operator to communicate with the UAV 204 and the landing station 206 using BLUETOOTH technology.

By way of an additional example, in one or more embodiments a UAV operator utilizes the client device 202 to interact with the UAV 204. The UAV 204 may take flight based on instruction provided by the client device 202 via local connection 212. The UAV operator may provide user input to the client device 202, which in turn, provides instructions to the UAV 204 to autonomously land utilizing the landing station 206. The UAV 204 may begin landing and approach the landing station 204 based on an energy transmitter included in the landing station 206. The UAV 204 may come into close proximity with the landing station 206, and lose contact with one or more transmitters. The UAV 204 may detect acceleration information (e.g., utilizing the measurement unit 104) and determine from the acceleration information (e.g., utilizing the acceleration analyzer 106) that the UAV 204 has come into contact with the landing station 206 (e.g., by comparing acceleration information with acceleration patterns 114 stored on the server 210). Based on the determination that the UAV 204 has contacted the landing station 206, the UAV 204 may shut down motors utilized by the UAV 204 for flight.

Accordingly, as illustrated in this previous example, the landing system 100 may be implemented in whole, or in part, by the individual elements 202-210 of the system 200. For instance, the landing system 100 may be implemented in its entirety on the UAV 204. Alternatively or additionally, different components and functions of the landing system 100 may be implemented separately among or across multiple of the client device 202, the server 210, the UAV 204, and the landing station 206.

Figure 3A:
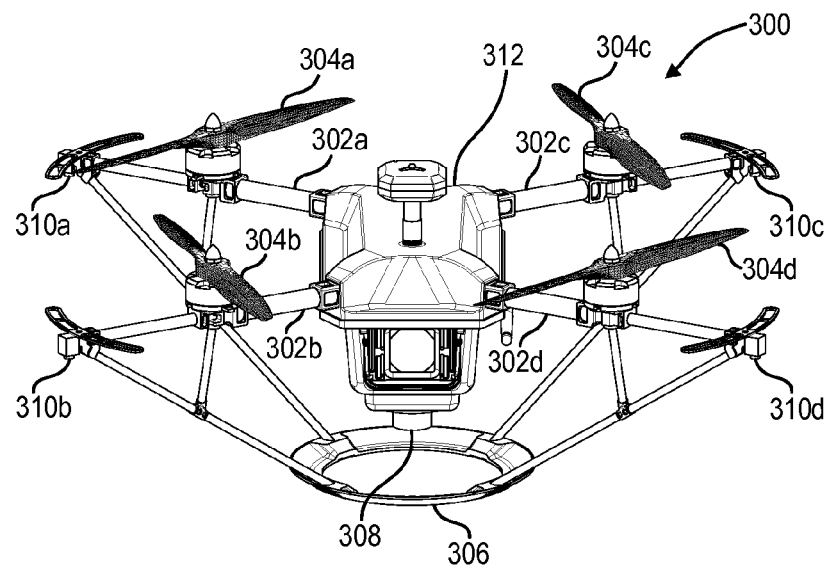
FIG. 3A illustrates a UAV preparing to land in a landing station in accordance with one or more embodiments.
Figure 3A:
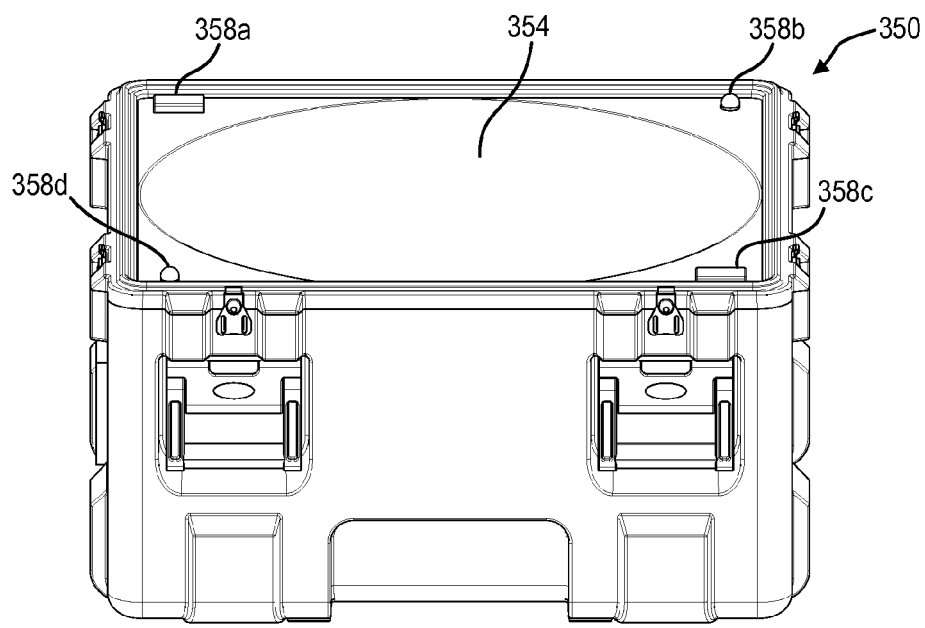

As just discussed, in one or more embodiments the landing system 100 enables the UAV 204 to land on the landing station 206. FIGS. 3A-3D illustrate landing a UAV in a landing station in accordance with one or more embodiments. Specifically, FIG. 3A illustrates a UAV 300 (i.e., one or more embodiments of the UAV 204) in flight above a landing station 350 (i.e., one or more embodiments of the landing station 206).

As shown, the UAV 300 can include a plurality of rotor arms 302a, 302b, 302c, and 302d, each supporting a rotor 304a, 304b, 304c, and 304d, respectively. It will be understood that by varying the pitch and speed of the rotors 304a, 304b, 304c, and 304d, the flight manager 108 can control the speed, direction, and altitude of the UAV 300. In additional or alternative embodiments, the UAV 300 may include fewer or additional rotor arms and rotors, depending on various factors such as the weight of the UAV 300. Additionally, the UAV 300 can include a computing device to use for controlling the UAV 300 based on input provided from one or more sensors.

Indeed, as shown in FIG. 3, the UAV 300 can include a plurality of sensors 310a, 310b, 310c, and 310d. Although the sensors 310a-310d are illustrated in FIG. 3A as being located at the distal ends of each of the rotor arms 302a-302d, in other embodiments, the sensors 310a-310d can be located anywhere along each of the rotor arms 302a-302d, or can be located on other portions of the UAV 300 (e.g., on a main body of the UAV 300). Each of the sensors 310a, 310b, 310c, and 310d may detect a single type of energy, or multiple types of energy. Additionally, or alternatively, the sensors 310-310d may detect other measurements or data, as described above.

The UAV 300 may also include other sensors or devices. For example, a housing 312 may include the measurement unit 104, including an inertial measurement unit or other measuring device. Additionally, as shown in FIG. 3, the UAV 300 can include a camera 308. In one or more embodiments, the camera 308 captures images utilized for landing or other purposes.

As shown in FIG. 3, the UAV 300 can also include a landing base 306. In one or more embodiments, the landing base 306 is angled or conical so as to correspond with a docking site 354. As illustrated, the docking site 354 can include a recess. In one or more embodiments, the docking site 354 includes a conical recess, or a recess shaped as a funnel. The conical docking site 354 can help guide the UAV 300 into proper position to enable the UAV 300 to correctly dock with the landing station 350. In additional or alternative embodiments, the docking site 354 can include a recess or protrusion that is cylindrical, hemispherical, cubical, or any other shape in order to appropriately accommodate docking the UAV 300.

Furthermore, as shown in FIG. 3A, the landing station 350 may include a plurality of transmitters 358a-358d. As shown, the transmitters may be located at various locations of the docking site 354. The transmitters 358a-358d may include various energy transmitters of varying frequencies, including light transmitters (e.g., light emitting diodes), infrared energy wave transmitters, radio frequency transmitters, electromagnetic transmitters, etc.

In one or more embodiments, the transmitters can create an energy field of various shapes and/or directions. For instance, in at least one embodiment, the transmitters 358a-358d can create a conical energy field projected vertically above the landing station 350. In other embodiments, the transmitters 358a-358d may project a horizontal energy field across the surface of the landing station 350.

In other embodiments, the transmitters 358a-358d may include SONAR or RADAR transmitters and/or receivers. For example, utilizing SONAR or RADAR, the transmitters 358a-358d may permit the landing station 350 to determine the altitude, location, direction, speed, or acceleration of one or more objects. In particular, the transmitters 358a-358d may utilize SONAR or RADAR to determine the altitude, location, direction, speed, or acceleration of the UAV 300 while landing.

The transmitters 358a-358d may also include electrical sensors capable of transmitting and detecting an electrical current and detecting contact with another object. For example, in one or more embodiments the transmitters 358a-358d may detect when the landing station 350 makes contact with another object by utilizing electrical sensors. Similarly, in one or more embodiments, the transmitters 358a-358d may detect if an object makes contact with the docking site 354.

As mentioned previously, the landing system 100 can determine that the UAV 300 is landing based on a variety of factors. In one or more embodiments, the landing system 100 determines that the UAV 300 is landing where the UAV 300 crosses one or more energy boundaries (or detects one or more energy fields). For example, the landing station 350 can utilize the transmitters 358a-358d to generate one or more energy fields vertically above the landing station 350. The landing system 100 (e.g., utilizing the sensors 310a-310d) can determine that the UAV 300 has crossed into (or is flying within) one or more energy fields generated by the landing station 350, and utilize the determination to identify that the UAV is landing. Similarly, the landing system 100 can determine that the UAV 300 has crossed from a first energy field (e.g., a wide conical energy field) into a second energy field (e.g., a narrower conical energy field). The landing system 100 can determine that the UAV 300 is landing based on the UAV 300 crossing into the second energy field (or crossing both the first and the second energy field).

Figure 3B:
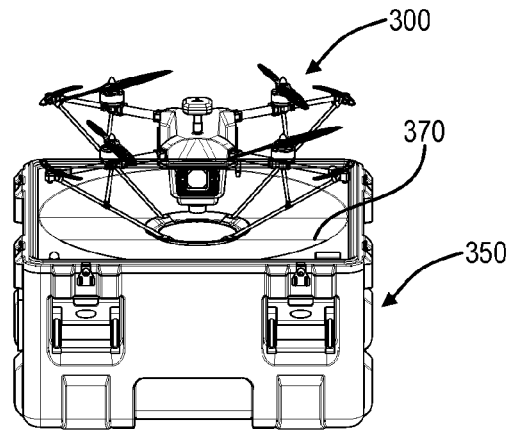
FIG. 3B illustrates the UAV of FIG. 3A landing in the landing station of FIG. 3A in accordance with one or more embodiments.

The landing system 100 can also determine that the UAV 300 is landing based on crossing one or more horizontal boundaries. For example, FIG. 3B illustrates the UAV 300 descending into the docking site 354. In one or more embodiments, the landing station 350 can detect when the UAV has crossed a horizontal boundary 370 at the top of the docking site 354. For example, as shown, the landing station 350 may transmit one or more beams (e.g., energy waves) across the docking site 354 to form the horizontal boundary 370. The landing system 100 (either via sensors aboard the UAV 300 or sensors within the landing station 350) may determine when the UAV 300 crosses the horizontal boundary 370 and identify that the UAV 300 is landing.

In addition to crossing one or more horizontal boundaries, in one or more embodiments, the landing system 100 determines that the UAV 300 is landing when the UAV 300 loses the ability to obtain certain information with regard to one or more of the transmitters 358a-358d or the sensors 310a-310d. For example, the sensitive and/or accuracy of some sensors may be compromised as the UAV 300 and the landing station 350 come into close proximity (e.g., sensors no longer align with transmitters or portions of the UAV 300, or the landing station 350 block the line of sight of one or more transmitters and/or sensors). Moreover, some transmitters simply may not work at close proximity ranges. For instance, in one or more embodiments that utilize light emitting diodes, when the UAV 300 comes nearer to the landing station 350, the light emitting diodes may overwhelm one or more sensors or optical devices (e.g., a filter on the camera 308). Similarly, some sensors lose accuracy because of ground interference (e.g., a barometric pressure sensor operating close to the ground may lose accuracy due to downwash from rotors of the UAV 300, which may cause the UAV 300 to move up and down). Accordingly, in one or more embodiments, the landing system 100 can determine a loss of information with regard to one or more transmitters or sensors and utilize the determination to identify that the UAV 300 is landing.

Moreover, the landing system 100 can determine that the UAV 300 is landing based on a distance between the UAV 300 and the landing station 350. For example, the landing system 100 can determine a distance between the transmitters 358a-358d and the landing base 306 (or some other portion of the UAV 300). In particular, in one or more embodiments, the landing system 100 can determine that the UAV 300 is within a pre-defined distance (e.g., 20 cm, 45 cm, some distance in between 20 cm and 45 cm, or some other distance) from the landing station 350 and based on the determination, identify that the UAV 300 is landing. Indeed, in one or more embodiments, the landing system 100 tends to lose information with regard to one or more sensors 310a-310d at approximately 20 cm from landing station 350. Accordingly, the landing system can detect that the UAV 300 is within 20 cm (or 45 cm, to provide a buffer before beginning to lose sensitivity) and, based on that determination, determine that the UAV is landing and enable one or more features or components of the landing system 100.

The landing system 100 can determine the distance between the UAV 300 and the landing station 350 using any number of approaches. For example, the UAV 300 may capture an image with the camera 308 and measure the distance, as portrayed in the image, between two or more transmitters. The landing system 100 may calculate a vertical distance to the landing station 350 based on the distance between the two or more transmitters as reflected in the image captured by the camera 308 (e.g., compare the horizontal distance between transmitters as reflected in an image to the actual horizontal distance to calculate a vertical distance). Alternatively, the UAV 300 may use SONAR, RADAR, GPS, or some other approach to calculate the distance.

Figure 3C:
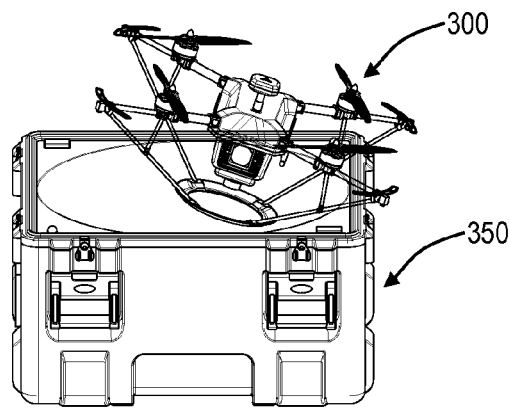
FIG. 3C illustrates the UAV of FIG. 3A landing in and contacting the landing station of FIG. 3A in accordance with one or more embodiments.

As the UAV 300 descends into the landing station 350, the UAV may tilt, rotate, or otherwise deviate from an ideal landing path relative to the landing station 350. Thus, as shown in FIG. 3C, the UAV 300 may tilt and come into contact with the landing station 350. As discussed previously, in one or more embodiments, the landing system 100 detects that the UAV 300 has contacted the landing station 350 and modifies operation of the UAV 300. In particular, the UAV 300 can utilize the sensors 310a-310d or other measuring devices (e.g., an inertial measuring unit in the housing 312) to detect an acceleration spike associated with a collision with the landing station 350.

The UAV 300 can detect an acceleration spike, including acceleration spikes of any duration or magnitude. Thus, in one or more embodiments, the landing system 100 may filter acceleration spikes to differentiate between a collision from other flight activities. For example, the landing system 100 may identify a number of acceleration spikes as the UAV 300 descends toward the landing station 350 (e.g., accelerations associated with blowing wind or simply descending). In one or more embodiments, the landing system 100 filters such acceleration spikes by comparing acceleration spikes to one or more acceleration patterns (e.g., patterns comprising acceleration thresholds).

For example, in one or more embodiments, the landing system 100 maintains a plurality of acceleration patterns indicative of a variety of flight events. The patterns may be defined based on a variety of criteria, including magnitude, duration, shape, slope, volatility, direction, location or other criteria. The patterns may include one or more thresholds. For example, in one or more embodiments, the landing system 100 maintains a magnitude threshold, a duration threshold, or some other threshold.

For example, the landing system 100 can identify a collision from one or more acceleration spikes by comparing an acceleration spike with a magnitude threshold and a duration threshold. For example, the landing system 100 can identify an acceleration threshold greater than acceleration experienced from normal flight activities. Thus, the landing system 100 can identify an acceleration spike indicative of a collision based on the acceleration spike having a magnitude greater than the magnitude threshold. Similarly, the landing system 100 can identify a duration threshold that is indicative of a collision (e.g., a short duration) as compared to an acceleration duration indicative of normal flight activities (e.g., a gust of wind, turbulence, etc.).

Upon detecting that the UAV 300 has collided with another object while landing, the landing system 100 can modify operation of the UAV 300. For example, the landing system 100 can modify a rotation rate of one or more rotors, modify a pitch of one or more rotors, modify a throttle level, stop one or more engines or motors, rotate the UAV 300, move the UAV 300, or otherwise modify operation of the UAV 300. For instance, in at least one embodiment, in response to detecting an acceleration spike indicative of a collision with the landing station 350, the landing system 100 can stop the rotors 304a-304d. By doing so, the landing system 100 may cause the UAV 300 to settle into the docking site 354, and avoid gyrating or bouncing out of the landing station 350.

In other embodiments, rather than turning off the rotors 304a-304d, the landing system 100 can slow the rotation rate of the rotors 304a-304d. For example, prior to a collision, the UAV 300 may be descending by utilizing a first rotation rate of the rotors 304a-304d; upon collision with another object, the landing system 100 can modify operation of the UAV 300 to a second rotation rate of the rotors 304a-304d (e.g., a rotation rate that is lower than the first rotation rate). In such a manner, the landing system 100 can reduce the chance of the UAV 300 bouncing out of the landing station 350 while allowing the UAV to settle into the docking site 354 smoothly.

Similarly, in one or more embodiments, in response to an acceleration spike indicative of contact with another object, the landing system 100 can modify some, but not all, of the rotors. Similarly, the landing system 100 can modify individual rotors differently from other rotors. For example, as shown in FIG. 3C, the UAV 300 may tilt and come into contact with the landing station 350. Based on the acceleration spike (and/or a determination that the UAV 300 is not level) the landing system 100 can modify the rotation rate of the rotors. In one or more embodiments, the landing system 100 can modify the rotation of rotors 304a and 304b to ensure that the UAV 300 drops into the docking site 354. In another embodiments, the landing system 100 can slow the rate of rotation for all of the rotors 304a-304d, but slow the rotors 304a, 304b more quickly than rotors 304c, 304d.

In one or more embodiments, the landing system 100 can modify operation of the UAV 300 in different ways, depending on the features of an acceleration spike. For instance, the landing system 100 can modify operation of the UAV 300 based on a pattern corresponding to the acceleration spike. For example, in one circumstance, the landing system 100 may detect an acceleration spike of a relatively high magnitude and short duration corresponding to an acceleration pattern of a sudden, hard collision. In response, the landing system 100 may turn off all of the rotors 304a-304d. In another circumstance, the landing system 100 may detect an acceleration spike of a slightly lower magnitude, and longer duration corresponding to a more mild collision. In response, the landing system 100 may reduce the rate of rotation of one or more rotors (i.e., rather than turning off all the rotors 304a-304d).

Figure 3D:
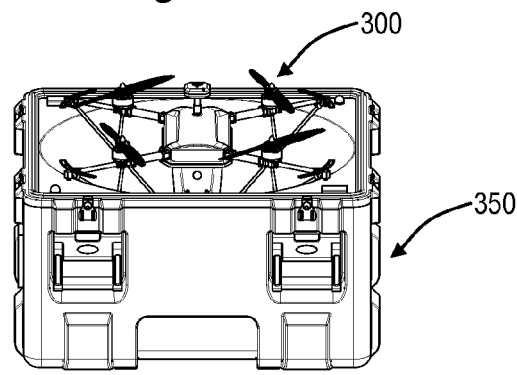
FIG. 3D illustrates the UAV of FIG. 3A within the landing station of FIG. 3A in accordance with one or more embodiments.

Ultimately, in one or more embodiments the landing system 100 guides the UAV 300 so that it comes to rest within the landing station 350. FIG. 3D illustrates the UAV 300 resting at the docking site 354 of the landing station 350. In one or more embodiments, the landing system 100 determines that the UAV 300 has landed when the UAV 300 is stationary and resting in the landing station 350 with one or more flight systems turned off (e.g., motors turned off).

Although FIG. 3C illustrates the UAV 300 coming into contact with the landing station 350, it will be appreciated that the UAV 300 may come into contact with other objects while landing. For example, if during landing a person reaches out and touches the UAV 300, the UAV 300 can detect an acceleration spike associated with the contact and the landing system 100 can modify operation of the UAV 300 (e.g., turn off the rotors to avoid accident or injury). In this manner, the landing system 100 can decrease the likelihood of injury.

Figure 4A:
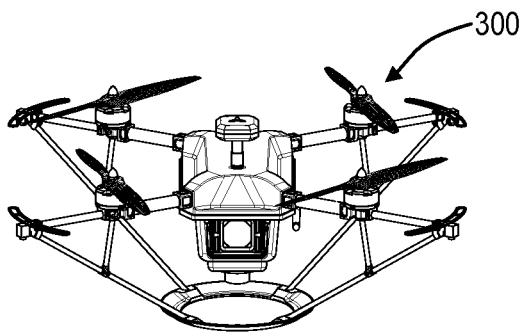
FIG. 4A illustrates a UAV landing on the ground in accordance with one or more embodiments.
Figure 4B:
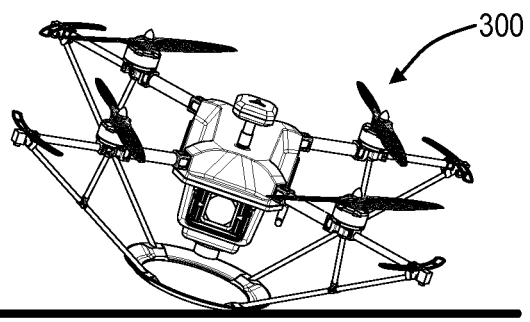
FIG. 4B illustrates a UAV contacting and landing on the ground in accordance with one or more embodiments.

Moreover, in at least one embodiment, the landing system 100 can land the UAV 300 without coming into contact with, or otherwise utilizing, the landing station 350. In particular, FIGS. 4A-4B illustrate the UAV 300 landing on the ground without the assistance of the landing station 350. In one or more embodiments, the landing system 100 can determine that the UAV 300 is landing, identify contact with one or more objects, and adjust operation of the UAV 300 without utilizing the landing station 350.

For instance, the landing system 100 may detect that the UAV 300 is landing without the benefit of the landing station 350. For example, the landing system 100 may detect that the UAV 300 is landing based on rotor speed, throttle level, rotation speed, altitude, velocity, distance to the ground, or some other measure. In particular, in one or more embodiments, the landing system 100 compares one or more measured features to a pre-defined threshold to determine if the UAV 300 is landing. For example, the landing system 100 may access a pre-defined rotor speed threshold indicative of landing (e.g., a rotor speed indicative of descent or resting after contact with a landing site). The landing system 100 can detect the rotor speed of the UAV 300, compare the rotor speed to the pre-defined rotor speed threshold, and determine that the UAV 300 is landing based on the comparison (e.g., if the rotor speed satisfies the rotor speed threshold).

In addition, the landing system 100 can determine the rotation speed of the UAV 300. More specifically, the landing system 100 can determine the rate that the UAV 300 is rotating in the air (e.g., rotating around a vertical axis). In one or more embodiments, the landing system 100 can compare the rotation speed to a threshold rotation speed and, based on the comparison, determine that the UAV 300 is landing. Similarly, the landing system 100 can measure a throttle level, altitude, velocity, or distance to the ground, and compare those measures to a pre-defined threshold to determine if the UAV 300 is landing.

The landing system 100 may consider a single factor in determining that the UAV 300 is landing, or a combination of multiple factors. For example, the landing system 100 may establish a combination of criteria to determine if the UAV 300 is landing. Specifically, in at least one embodiment, the landing system 100 determines that the UAV 300 is landing based on a determination that: (1) the throttle level is within a throttle level threshold; (2) the rotation rate is within the rotation rate threshold; and (2) the velocity is within a velocity threshold.

Moreover, in one or more embodiments, the landing system 100 may determine that the UAV 300 is landing based on user input. For example, in one or more embodiments, a user can provide information to the landing system 100 (e.g., by operating with a user interface via the client device 202) indicating that the UAV 300 is landing. More specifically, a user can indicate the beginning of a landing sequence and then, as illustrated in FIGS. 4A and 4B, communicate with the UAV 300 to navigate the UAV 300 toward the ground (e.g., communicate with the UAV 300 to initiate an autonomous landing sequence or remotely control the UAV 300 during landing). Upon contact with the ground, the landing station 100 may detect acceleration indicative of landing and modify operation of the UAV 300 to provide a more smooth landing. For example, the landing station 100 can automatically reduce the throttle level upon contact with the ground so that the UAV settles smoothly onto the ground.

Various exemplary embodiments have been provided with regard to methods and/or factors utilized by the landing system 100 to determine that the UAV 300 is landing (or is at a particular part of the landing process). As mentioned previously, in one or more embodiments, the landing system 100 enables one or more components or features based on the determination that the UAV 300 is landing (or at a particular portion of the landing process). In particular, in one or more embodiments, the landing system 100 enables functionality of features and components that modify operation of the UAV 300 utilizing certain acceleration. Thus, a determination that the UAV 300 is landing may be utilized by the landing system 100 to enable landing capabilities.

By way of more specific example, the landing system 100 can turn off one or more motors utilized for flight of the UAV 300 in response to an acceleration spike indicating that the UAV 300 has come into contact with another object. In one or more embodiments, the landing system 100 will not enable features or components that turn off the one or more motors utilized for flight of the UAV 300 in response to the acceleration spike, unless the landing system 100 has determined that the UAV 300 is landing (or in a particular phase of landing). Indeed, turning off one or more motors if the UAV 300 made contact with a tree during normal flight operations could cause serious damage to the UAV 300. Thus, the landing system 100 can enable or disable any of the features or components discussed herein based on a determination that the UAV 300 is landing (or in a particular portion of landing).

Moreover, the landing system 100 can enable features or components at a number of different stages of landing. For instance, the landing system 100 can enable features or components upon detecting that the UAV 300 is descending toward a landing site; upon detecting that the UAV 300 is within a certain proximity to a landing site; upon detecting that the UAV 300 has crossed one or more boundaries; upon detecting that the UAV 300 has entered a docking site; upon detecting that the UAV 300 is at a certain altitude; upon detecting a certain throttle level; upon detecting a certain velocity; upon detecting a certain position; upon detecting that the UAV 300 has made contact with a landing station (or the ground); upon detecting that the UAV 300 is stationary; or upon any detecting any other factor or event.

The landing system 100 can also enable different features at different stages of landing. For example, when the UAV 300 is within six feet of the ground, the landing system 100 can initiate features or components that will turn off motors powering the UAV 300 during flight only if the UAV 300 experiences a sudden, forceful collision with another object (e.g., runs into a person). When the UAV 300 comes closer to the ground, the landing system 100 can initiate features or components that will turn off motors powering the UAV 300 during flight if the UAV 300 experiences less forceful contact with another object (e.g., lightly touches the ground).

In addition to enabling components, the landing system 100 can also disable one or more features or components at various stages of landing. For example, upon detecting that the UAV 300 is within a certain distance of the ground (e.g., three feet or some other distance), the UAV 300 can shut off certain sensors that tend to experience interference as the UAV 300 approaches the ground. Similarly, upon detecting that the UAV 300 has touched the ground, the landing system 100 can shut down various systems or components (e.g., motors, rotors, computing devices, guidance systems, flight manager 108, measurement unit 104, acceleration analyzer 106, or other components). Thus, in one or more embodiments, the landing system 100 speeds the completion of landing. Indeed, by utilizing acceleration information, the landing system 100 can quickly and efficiently shut down systems of the UAV 300 upon making contact with a landing site.

For instance, in one or more embodiments, the landing system 100 shuts down various systems and components upon determining that: (1) a throttle output is below a threshold level (e.g., threshold level is at a minimum); (2) that the UAV is not rotating within a threshold (e.g., no rotation in any direction); (3) that the UAV's altitude does not change for a certain amount of time; (4) that the UAV's velocity is within a certain threshold (e.g., no velocity in an direction) and (5) that the UAV's position does not change for a certain amount of time. In other embodiments, the landing system considers these five factors individually. In other embodiments, the landing system considers these five elements together with whether the UAV 300 has come into contact with a landing site. In yet other embodiments, the landing system 100 shuts down various systems and components simply upon contact with a landing site (e.g., the ground or a landing station 350).

Thus, for example, as illustrated in FIG. 4A, the landing system 100 may determine that the UAV 300 is landing based on the distance of the UAV 300 from the ground. Moreover, as illustrated in FIG. 4B, the UAV 300 may come into contact with the ground. Based on the determination that the UAV 300 is landing and the determination that the UAV 300 has come into contact with the ground, the landing system 100 can modify operation of the UAV 300. In particular, (as discussed previously) the landing system 100 can determine that the UAV 300 has come into contact with the ground by detecting acceleration of the UAV, and, in response, turn off one or more motors (or other systems). In such a manner, the landing system 100 can assist in landing the UAV 300 in a quick, smooth, and efficient manner.

Figure 5:
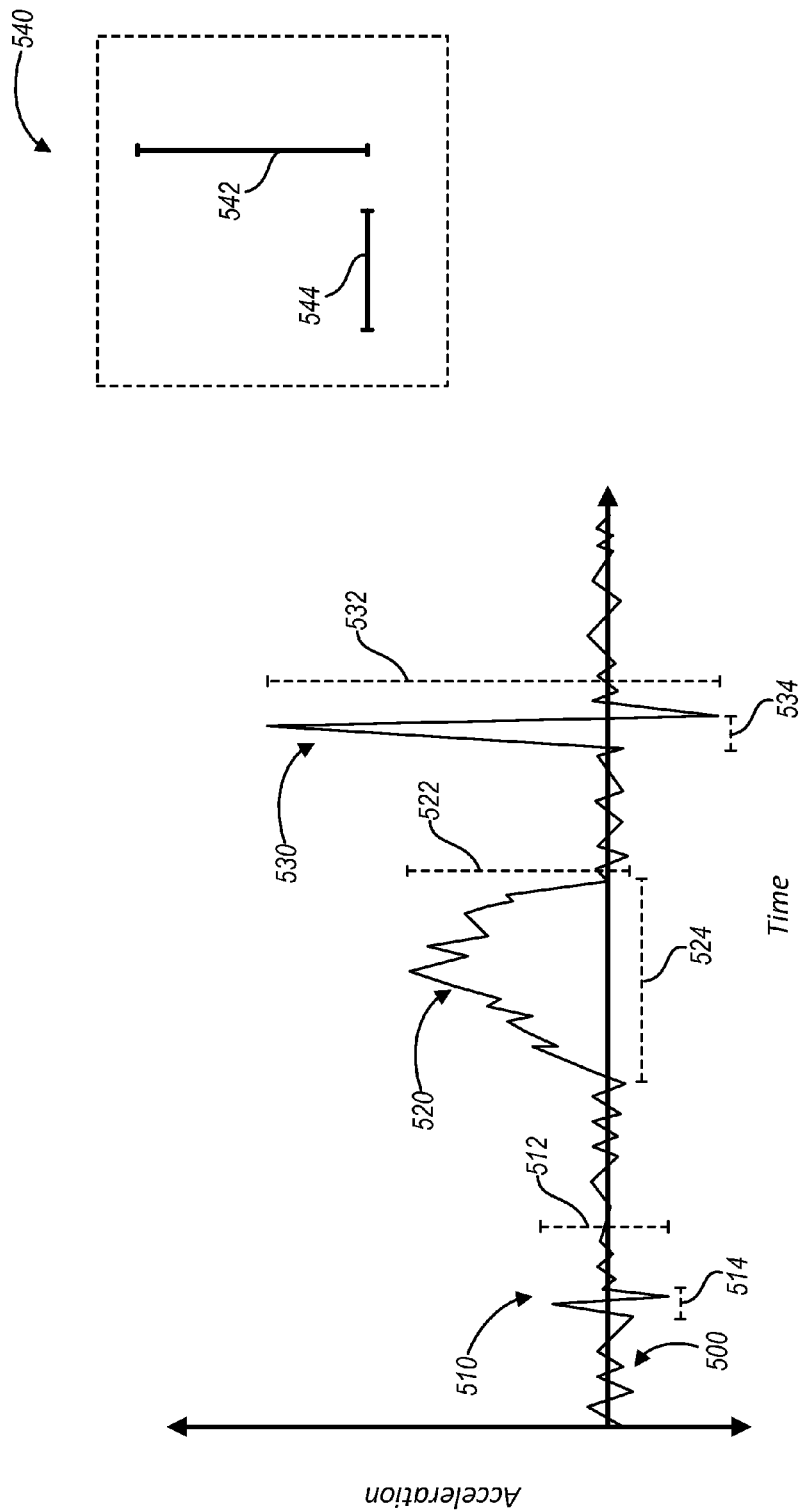
FIG. 5 illustrates a sample graph of acceleration of the UAV over time in accordance with one or more embodiments.

Turning now to FIG. 5, additional detail will be provided with regard to determining an acceleration spike in accordance with one or more embodiments. FIG. 5 illustrates a graph with a data line 500 representing acceleration (along the vertical axis) over time (along the horizontal axis) with regard to the UAV 300 while landing according to one or more embodiments. As illustrated, the data line 500 includes a number of acceleration spikes, including a first spike 510, a second spike 520, and a third spike 530.

In one or more embodiments, the landing system 100 can identify one or more acceleration spikes. In particular, in one or more embodiments the landing system 100 determines acceleration spikes by detecting one or more maximum and minimum points within the data line 500. For example, in one or more embodiments, the landing system 100 detects a minimum point, a maximum point, and a minimum point over time to identify an acceleration spike. Similarly, in one or more embodiments, the landing system 100 identifies an acceleration spike based on variation from a baseline acceleration measurement (e.g., variation from an acceleration of 0 or 1 g).

As discussed above, in one or more embodiments the landing system 100 compares an acceleration spike to one or more pre-defined patterns. For example, the landing system 100 can compare the features of a detected acceleration spike to the features of a pre-defined pattern. In particular, the landing system 100 can compare the magnitude, duration, slope, volatility, shape, or other features of an acceleration spike in the data line 500 to the magnitude, duration, slope, volatility, shape, or other features of a pre-defined pattern (e.g., magnitude thresholds, duration thresholds, slope thresholds, volatility thresholds, or other thresholds).

For example, as illustrated in FIG. 5, the landing system 100 may include a pattern 540 with a magnitude threshold 542 (e.g., representing a minimum required acceleration) and a duration threshold 544 (e.g., representing a maximum acceleration duration). The pattern 540 is indicative of a sudden collision with an object (e.g., short duration, high magnitude acceleration). In one or more embodiments, the landing system 100 compares the first spike 510, the second spike 520, and the third spike 530 with the pattern 540 to determine whether the UAV 300 has collided with another object.

With regard to the first spike 510, the landing system can determine that a duration 514 of the first spike 510 falls within the duration threshold 544 (i.e. a short duration acceleration) but a magnitude 512 of the first spike 510 does not meet the magnitude threshold 542 (i.e., the magnitude of the acceleration is not large enough). Accordingly, the loading system 100 can determine that the first spike 510 is not indicative of a sudden collision with an object. For example, the first spike 510 may be indicative of a sudden change of direction of the UAV 300 while landing to align with the landing station 350.

Similarly, with regard to the second spike 520, the landing system 100 can determine that although a magnitude 522 of the second spike 520 satisfies the magnitude threshold 542, a duration 524 of the second spike 520 does not satisfy the duration threshold 544 (e.g., the duration of the spike is too long). For example, the second spike 520 may be indicative of a UAV experiencing rough turbulence and/or falling through a pocket of low-density air. Alternatively, the second spike 520 may be indicative of a UAV pilot controlling the UAV into a steep climb or dive.

With regard to the third spike 530, the landing system 100 determines that a magnitude 532 of the third spike 530 satisfies the magnitude threshold 542 and a duration 534 of the third spike 530 satisfies the duration threshold 544. Accordingly, the landing system 100 determines that the third spike is indicative of contact with another object. Moreover, based on that determination, the landing system can modify operation of the UAV 300 while landing.

Although FIG. 5 illustrates the pattern 540 based on the magnitude threshold 542 and the duration threshold 544 indicative of a collision, the landing system 100 can utilize patterns utilizing a variety of other features indicative of any number of events. For example, the landing system 100 can utilize patterns to detect a type of collision, a force associated with a collision, a material associated with a collision, or an object (e.g., the landing station 350) associated with a collision.

As mentioned previously, the landing system 100 can also generate or modify patterns. For example, the landing system 100 can generate or modify the pattern 540. Specifically, in one or more embodiments, the landing system 100 can generate the pattern 540 by based on previously detected acceleration spikes. For instance, the landing system 100 can detect an acceleration spike corresponding to the UAV 300 coming into contact with an object on a previous flight, and generate the pattern 540 based on the detected acceleration spike.

Although the pattern 540 indicates a pattern indicative of contact with another object, the landing system 100 can generate a variety of patterns. For instance, the landing system 100 can identify patterns indicative of particular types of contact, contact with particular materials, or other flight events (e.g., falling, aerial maneuvers). For example, the landing system 100 can identify such patterns based on acceleration frequency, acceleration amplitude compared with known circumstances (e.g., acceleration amplitude corresponding to known flight operations, acceleration amplitude corresponding to collisions, acceleration amplitude corresponding to certain materials, etc.), or other acceleration information. Similarly, the landing system 100 can identify patterns by combining acceleration information with other flight information, such as altitude of a UAV (e.g., pattern of hitting branches of a tree consists of a particular acceleration frequency at a certain altitude range). Moreover, the landing system 100 can identify patterns specific to collisions, materials, or other events by filtering out acceleration information attributable to system requests (e.g., filter out acceleration information corresponding to requested navigation changes from a UAV operator). The landing system 100 can utilize these patterns to identify acceleration spikes and corresponding events.

Moreover, the landing system 100 can modify patterns (e.g. the pattern 540). For instance, based on the magnitude 532 and the duration 534, the landing system 100 can modify the threshold magnitude 542 and/or the duration threshold 544. In particular, the landing system 100 can increase the magnitude threshold 542 and decrease the duration threshold 544 (e.g., because the magnitude 532 is larger than the magnitude threshold 542 and because the duration 534 is smaller than the duration threshold 544).

In one or more embodiments, the landing station 100 will modify a pattern where a detected acceleration spike differs from the pattern by a certain amount. For instance, in one or more embodiments where the magnitude 532 exceeds the magnitude threshold 542 by more than 50%, the landing system 100 can modify the magnitude threshold (e.g., by 5% or some other amount).

The landing system 100 can also create or modify one or more patterns based on the first spike 510 and the second spike 520. For instance, the landing system 100 can create an acceleration pattern based on the first spike 510 and/or the second spike 520 indicative of turbulence or steep climbs. The landing system 100 can utilize such patterns to distinguish acceleration spikes caused by various events (e.g., distinguish acceleration spikes caused by navigation from acceleration spikes caused by contact with another object).

In other embodiments, the landing system 100 can create or modify patterns based on user input. For instance, a user can identify an event (e.g., turbulence or contact) that corresponds to one or more acceleration spikes so that the landing system 100 can create one or more patterns. For example, a user can identify the third spike 530 as indicative of contact with another object and the landing system 100 can create or modify a pattern based on features of the third spike 530.

Similarly, the landing system 100 can create or modify one or more patterns via user input of one or more pattern features. For example, a user can specify one or more thresholds indicative of the UAV 300 coming into contact with another object. For instance, in one or more embodiments, a user can define pattern 540 by providing user input of the magnitude threshold 542 and the duration threshold 544.

It will be appreciated that, although FIG. 5 illustrates a single, two-dimensional graph of acceleration over time, the landing system 100 can detect acceleration in three-dimensional space. For example, one or more embodiments utilize multiple accelerometers to detect acceleration in multiple different directions. The landing system 100 can detect acceleration information from each of the accelerometers and detect acceleration spikes with regard to teach of the accelerometers.

Moreover, at least one embodiment utilizes multiple accelerometers to calculate a net acceleration and a direction. For example, the landing system 100 can combine acceleration information obtained from three (or more) different accelerometers to calculate a net acceleration and a net direction of acceleration. Thus, the landing system 100 can detect an acceleration spike in a particular direction.

In addition, although discussed predominantly herein in terms of acceleration, the landing system 100 may also use other measures to accomplish its functions. For example, the loading system 100 may utilize velocity or position data to determine that the UAV 300 has come into contact with another object. Indeed, although FIG. 5 illustrates an acceleration measure, the landing system 100 may also identify velocity spikes, compare velocity spikes with one or more pre-defined patterns, and utilize the comparison to determine that the UAV 300 has contacted another object. Similarly, the landing system 100 may also detect a sudden change in position, compare the change in position to pre-defined patterns, and utilize the comparison to determine that the UAV 300 has come into contact with another object.

Figure 6:
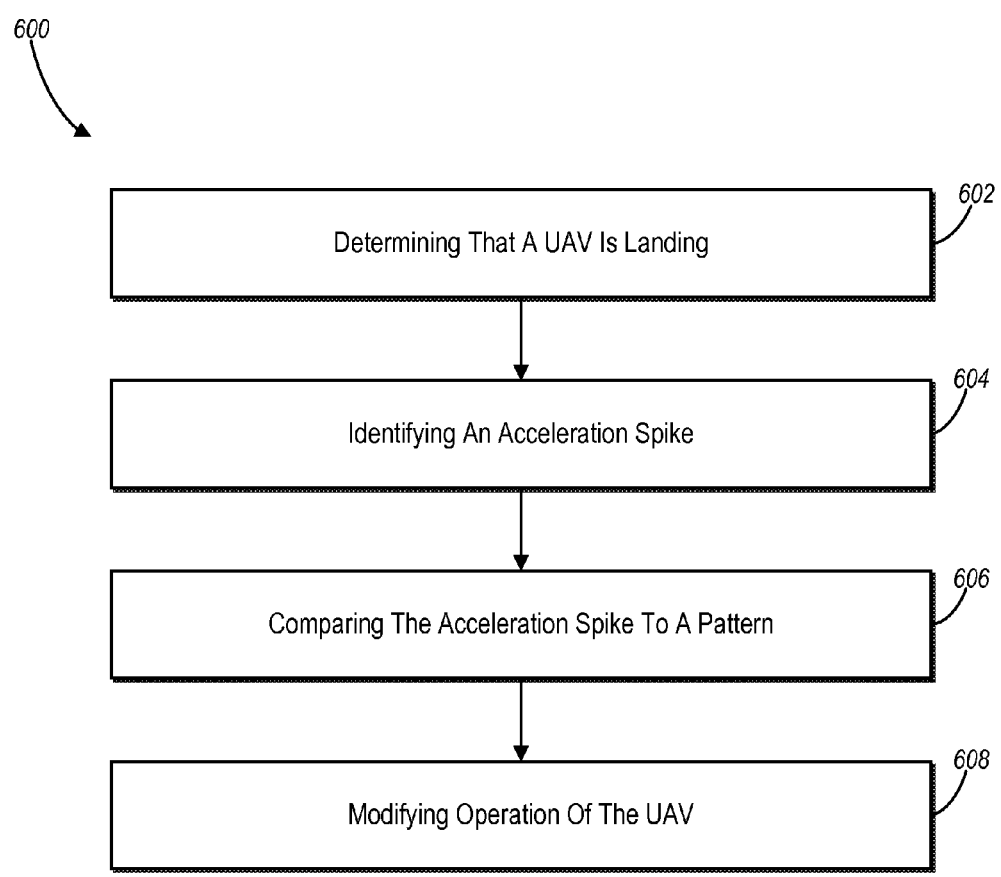
FIG. 6 illustrates a flowchart of a series of acts in a method of providing a workspace in accordance with one or more embodiments.

FIGS. 1-5, the corresponding text, and the examples, provide a number of different systems and devices that allows a user to facilitate landing one or more UAVs. In addition to the foregoing, embodiments can also be described in terms of flowcharts comprising acts and steps in a method for accomplishing a particular result. For example, FIG. 6 illustrates a flowchart of an exemplary method in accordance with one or more embodiments of the present invention. The method described in relation to FIG. 6 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method 600 of landing a UAV utilizing acceleration information. In one or more embodiments, the method 600 is performed in an environment that includes the system 200. The method 600 is intended to be illustrative of one or more methods in accordance with the present disclosure, and is not intended to limit potential embodiments. Alternative embodiments can include additional, fewer, or different steps than those articulated in FIG. 6.

The method 600 includes an act 602 of determining that a UAV is landing. In particular, the act 602 can include determining, by at least one processor, that a UAV is landing. Moreover, the act 602 can comprise detecting a throttle level and comparing the throttle level to a pre-defined throttle level threshold; detecting a rotation rate and comparing the rotation rate to a pre-defined rotation rate threshold; or detecting a velocity and comparing the velocity to a pre-defined velocity threshold. In addition, the act 602 can include determining that a UAV is within a pre-defined distance of a landing site (e.g., a landing station). Similarly, the act 602 can include determining a loss of information with regard to one or more transmitters associated with a landing station. Furthermore, the act 602 may include detecting that a UAV has a crossed a boundary associated with a landing station, wherein the boundary comprises an energy emission from a landing station. As mentioned previously, in one or more embodiments of the method 600, the act 602 (or other acts) may be omitted.

As illustrated in FIG. 6, the method 600 also includes an act 604 of identifying an acceleration spike. In particular, the act 604 can include identifying an acceleration spike with regard to the UAV while landing. For example, the act 604 can include detecting a duration of the acceleration spike. Similarly, the act 604 can include detecting a magnitude of the acceleration spike. Furthermore, the act 604 may include determining a direction associated with the acceleration spike. Moreover, the act 604 may include determining, by the at least one processor, that the UAV has made contact with another object by detecting an acceleration spike with regard to the UAV.

In addition, as shown in FIG. 6, the method 600 also includes an act 606 of comparing the acceleration spike to a pattern. For instance, the act 606 may include comparing, by the at least one processor, a magnitude of the acceleration spike to a pre-defined magnitude threshold. Similarly, the act 606 may include comparing the duration of the acceleration spike to a pre-defined duration threshold. Furthermore, in at least one embodiment of method 600, the pre-defined magnitude threshold is based on an acceleration magnitude associated with physical contact between the UAV and another object. Similarly, in at least one embodiment of method 600, the pre-defined acceleration duration threshold is based on an acceleration duration associated with physical contact between the UAV and another object.

Moreover, the act 606 may include determining, by the at least one processor, that the UAV has made contact with another object by comparing the acceleration spike to a pre-defined pattern. For instance, in one or more embodiments of the method 600, the pre-defined pattern comprises a magnitude threshold and a duration threshold and comparing the acceleration spike to the pre-defined pattern comprises comparing a magnitude of the acceleration spike with the magnitude threshold and comparing a duration of the acceleration spike with the duration threshold.

Moreover, as illustrated in FIG. 6, the method 600 includes the act 608 of modifying operation of the UAV. In particular, the act 608 can include modifying, by the at least one processor, operation of the UAV while landing based on the comparison of the magnitude of the acceleration spike to the pre-defined magnitude threshold. The act 608 may also include reducing the rotation speed of at least one of one or more rotors utilized by the UAV for flight based on the comparison of the magnitude of the acceleration spike to the pre-defined magnitude threshold. Similarly, the act 608 can include modifying operation of the UAV while landing based on the comparison of the duration of the acceleration spike to the pre-defined duration threshold. In addition, the act 608 can include turning off one or more motors utilized by the UAV for flight. Furthermore the act 608 can include reducing a rotational speed of one or more rotors utilized by the UAV for flight. Moreover, the act 608 can include modifying operation of the UAV while landing based on the direction associated with the acceleration spike. In addition, the act 608 may also include reducing the rotation speed of one or more rotors utilized by the UAV for flight based on the determination that the UAV has made contact with another object.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. In certain particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the invention. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
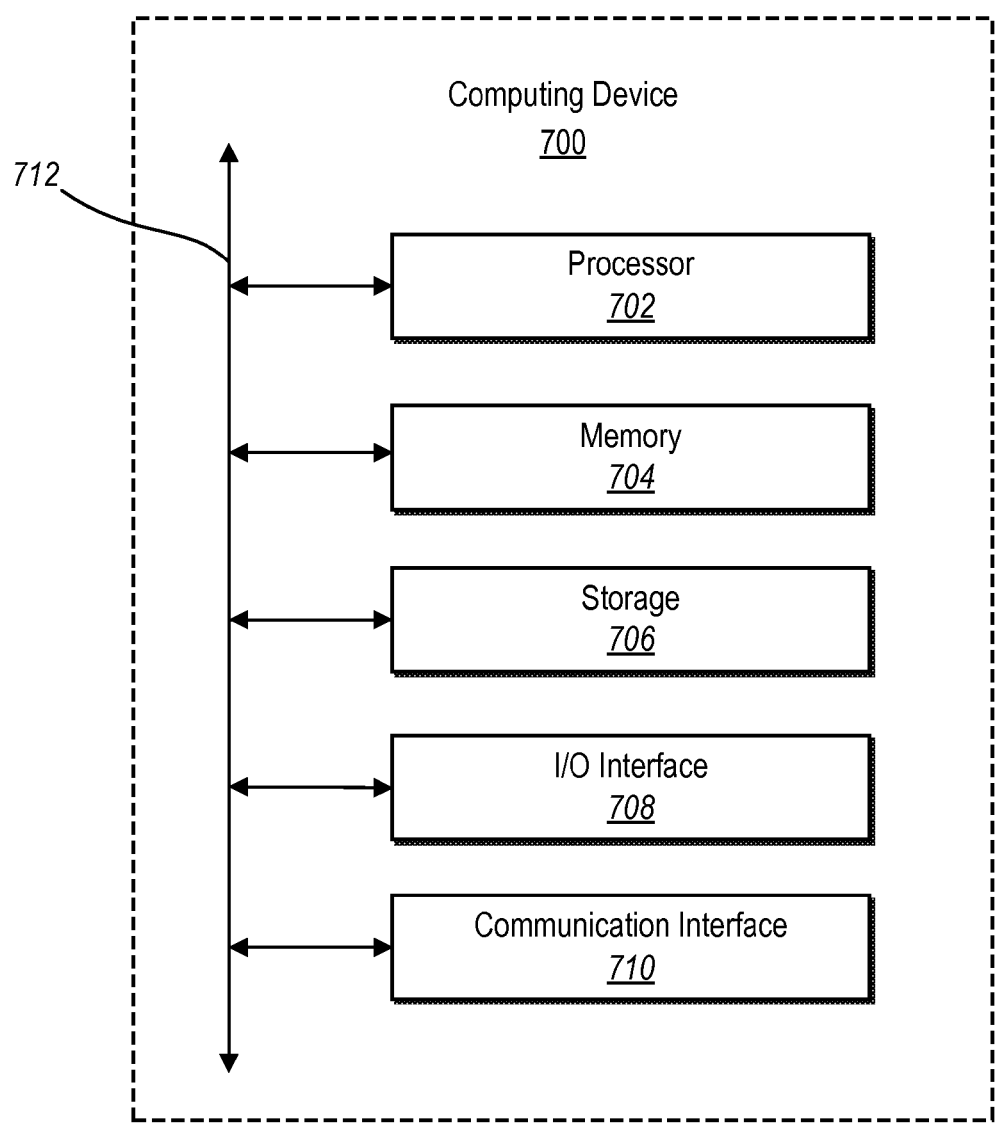
FIG. 7 illustrates a block diagram of an exemplary computing device in accordance with one or more embodiments.

FIG. 7 illustrates, in block diagram form, an exemplary computing device 1100 that may be configured to perform one or more of the processes described above. One will appreciate that the policy selection system 100 can comprise implementations of the computing device 700. As shown by FIG. 7, the computing device can comprise a processor 702, memory 704, a storage device 706, an I/O interface 708, and a communication interface 710. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor(s) 702 includes hardware for executing instructions, such as those making up a computer program. As an example and not by way of limitation, to execute instructions, processor(s) 702 may retrieve (or fetch) the instructions from an internal register, an internal cache, memory 704, or a storage device 706 and decode and execute them. In particular embodiments, processor(s) 702 may include one or more internal caches for data, instructions, or addresses. As an example and not by way of limitation, processor(s) 702 may include one or more instruction caches, one or more data caches, and one or more translation lookaside buffers (TLBs). Instructions in the instruction caches may be copies of instructions in memory 704 or storage 706.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The computing device 700 includes a storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In particular embodiments, storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 700 also includes one or more input or output ("I/O") devices/interfaces 708, which are provided to allow a user to provide input to (such as user strokes), receive output from, and otherwise transfer data to and from the computing device 700. These I/O devices/interfaces 708 may include a mouse, keypad or a keyboard, a touch screen, camera, optical scanner, network interface, modem, other known I/O devices or a combination of such I/O devices/interfaces 708. The touch screen may be activated with a stylus or a finger.

The I/O devices/interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 710. As an example and not by way of limitation, computing device 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 700 may include any suitable communication interface 710 for any of these networks, where appropriate.

The computing device 700 can further include a bus 712. The bus 712 can comprise hardware, software, or both that couples components of computing device 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method, comprising:
   determining, by at least one processor, that a UAV is landing by determining a loss of information with regard to one or more transmitters associated with a landing station;
   controlling an acceleration-based landing feature such that when the UAV is not landing, the acceleration-based landing feature is disabled and when the UAV is landing the acceleration-based landing feature is enabled;
   based on the determination that the UAV is landing and the determination of the loss of information with regard to the one or more transmitters associated with the landing station, applying the acceleration-based landing feature by:
      identifying an acceleration spike with regard to the UAV while landing;
      comparing, by the at least one processor, a magnitude of the acceleration spike to a pre-defined magnitude threshold; and
      based on the comparison of the magnitude of the acceleration spike to the pre-defined magnitude threshold, modifying, by the at least one processor, operation of the UAV while landing.

2. The method of claim 1, further comprising
   detecting a duration of the acceleration spike;
   comparing the duration of the acceleration spike to a pre-defined duration threshold; and
   based on the comparison of the duration of the acceleration spike to the pre-defined duration threshold, modifying operation of the UAV while landing.

3. The method of claim 2,
   wherein the pre-defined magnitude threshold is based on an acceleration magnitude associated with physical contact between the UAV and another object; and
   wherein the pre-defined acceleration duration threshold is based on an acceleration duration associated with physical contact between the UAV and another object.

4. The method of claim 1, wherein
   determining that the UAV is landing comprises:
      detecting a throttle level;
      detecting a rotation rate;
      detecting a velocity;
      comparing the throttle level to a pre-defined throttle level threshold;
      comparing the rotation rate to a pre-defined rotation rate threshold; and
      comparing the velocity to a pre-defined velocity threshold; and
   applying the acceleration-based landing feature based on the determination that the UAV is landing comprises:
      applying the acceleration-based landing feature based on the comparison of the throttle level to the pre-defined throttle level threshold, the comparison of the rotation rate to the pre-defined rotation rate threshold, and the comparison of the velocity to the pre-defined velocity threshold.

5. The method of claim 1, wherein
   determining that the UAV is landing comprises determining that the UAV is within a pre-defined distance of a landing site; and
   applying the acceleration-based landing feature based on the determination that the UAV is landing comprises:
      applying the acceleration-based landing feature based on the determination that the UAV is within the pre-defined distance of the landing site.

6. The method of claim 1, wherein applying the acceleration-based landing feature further comprises: determining that the UAV has made contact with another object.

7. The method of claim 1, wherein
   determining that the UAV is landing comprises detecting that the UAV has crossed a boundary associated with a landing station, wherein the boundary comprises an energy emission from a landing station; and
   applying the acceleration-based landing feature based on the determination that the UAV is landing comprises:
      applying the acceleration-based landing feature based on detecting that the UAV has crossed the boundary associated with the landing station, wherein the boundary comprises an energy emission from the landing station.

8. The method of claim 1, wherein modifying operation of the UAV while landing comprises at least one of: turning off one or more motors utilized by the UAV for flight or reducing a rotational speed of one or more rotors utilized by the UAV for flight.

9. The method of claim 1, further comprising:
   determining a direction of acceleration associated with the acceleration spike; and based on the direction of the acceleration associated with the acceleration spike, modifying operation of the UAV while landing.

10. A system comprising:
a UAV comprising one or more rotors utilized by the UAV for flight;
a landing station comprising one or more transmitters;
at least one processor; and
at least one non-transitory computer readable storage medium storing instructions thereon, that, when executed by the at least one processor, cause the system to:
determine, by the at least one processor, that the UAV is landing by determining a loss of information with regard to the one or more transmitters associated with the landing station;
control an acceleration-based landing feature such that when the UAV is not landing, the acceleration-based landing feature is disabled and when the UAV is landing the acceleration-based landing feature is enabled;
based on the determination that the UAV is landing, apply the acceleration-based landing feature by:
identifying an acceleration spike with regard to the UAV;
comparing, by the at least one processor, a magnitude of the acceleration spike to a pre-defined magnitude threshold; and
based on the comparison of the magnitude of the acceleration spike to the pre-defined magnitude threshold, reducing the rotation speed of at least one of the one or more rotors utilized by the UAV for flight.

11. The system of claim 10, further comprising instructions that, when executed by the at least one processor, cause the system to:
detect a duration of the acceleration spike;
compare the duration of the acceleration spike to a pre-defined duration threshold; and
based on the comparison of the duration of the acceleration spike to the pre-defined duration threshold, modify operation of the UAV while landing.

12. The system of claim 10, wherein determining that the UAV is landing comprises:
detecting a throttle level;
detect a rotation rate;
detect a velocity;
comparing the throttle level to a pre-defined throttle level threshold;
comparing the rotation rate to a pre-defined rotation rate threshold; and
comparing the velocity to a pre-defined velocity threshold.

13. The system of claim 10, wherein applying the acceleration-based landing feature further comprises: determining that the UAV has made contact with another object.

14. The system of claim 10,
wherein determining that the UAV is landing comprises detecting that the UAV has crossed a boundary associated with the landing station, wherein the boundary comprises an energy emission from the one or more transmitters of the landing station.

15. The system of claim 10, further comprising instructions that, when executed by the at least one processor, cause the system to:
determine a direction associated with the acceleration spike; and
based on the direction associated with the acceleration spike, modifying operation of the UAV while landing.

16. The system of claim 10,
wherein determining that a UAV is landing comprises determining that the UAV is within a pre-defined distance of the landing station.

17. A non-transitory computer readable medium storing instructions thereon that, when executed by at least one processor, cause a computer system to:
determine, by at least one processor, that a UAV is landing by determining a loss of information with regard to one or more transmitters associated with a landing station;
control an acceleration-based landing feature such that when the UAV is not landing, the acceleration-based landing feature is disabled and when the UAV is landing the acceleration-based landing feature is enabled;
based on the determination that the UAV is landing, apply the acceleration-based landing feature by:
identifying an acceleration spike with regard to the UAV while landing;
comparing, by the at least one processor, a magnitude of the acceleration spike to a pre-defined magnitude threshold; and
based on the comparison of the magnitude of the acceleration spike to the pre-defined magnitude threshold, modifying, by the at least one processor, operation of the UAV while landing.

18. The computer readable storage medium of claim 17, further comprising instructions that, when executed by the at least one processor, cause the system to:
detect a duration of the acceleration spike;
compare the duration of the acceleration spike to a pre-defined duration threshold; and
based on the comparison of the duration of the acceleration spike to the pre-defined duration threshold, modify operation of the UAV while landing.

19. The computer readable storage medium of claim 17, wherein determining that the UAV is landing comprises:
detecting a throttle level;
detecting a rotation rate;
detecting a velocity;
comparing the throttle level to a pre-defined throttle level threshold;
comparing the rotation rate to a pre-defined rotation rate threshold; and
comparing the velocity to a pre-defined velocity threshold; and
applying the acceleration-based landing feature based on the determination that the UAV is landing comprises:
applying the acceleration-based landing feature based on the comparison of the throttle level to the pre-defined throttle level threshold, the comparison of the rotation rate to the pre-defined rotation rate threshold, and the comparison of the velocity to the pre-defined velocity threshold.

20. The computer readable storage medium of claim 17, further comprising instructions that, when executed by the at least one processor, cause the system to:
determine a direction of acceleration associated with the acceleration spike; and
based on the direction of acceleration associated with the acceleration spike, modify operation of the UAV while landing.

* * * * *